United States Patent
Bonander

(10) Patent No.: US 10,683,005 B2
(45) Date of Patent: *Jun. 16, 2020

(54) METHOD AND SYSTEM FOR AUTOMATED PARKING OF A VEHICLE

(71) Applicant: Volvo Car Corporation, Göteborg (SE)

(72) Inventor: Martin Bonander, Stora Höga (SE)

(73) Assignee: Volvo Car Corporation, Göteborg (SE)

(*) Notice: Subject to any disclaimer, the term of this patent is extended or adjusted under 35 U.S.C. 154(b) by 0 days.

This patent is subject to a terminal disclaimer.

(21) Appl. No.: 16/128,588

(22) Filed: Sep. 12, 2018

(65) Prior Publication Data
US 2019/0092317 A1 Mar. 28, 2019

(30) Foreign Application Priority Data
Sep. 25, 2017 (EP) .................................. 17192793

(51) Int. Cl.
*B60W 30/06* (2006.01)
*B62D 15/02* (2006.01)
(Continued)

(52) U.S. Cl.
CPC ............ *B60W 30/06* (2013.01); *B60W 50/08* (2013.01); *B62D 15/027* (2013.01);
(Continued)

(58) Field of Classification Search
CPC ..... B60W 30/06; B60W 50/08; B62D 15/027; B62D 15/0285; G05D 1/0033; G06K 9/00805

See application file for complete search history.

(56) References Cited

U.S. PATENT DOCUMENTS 8,996,224 B1* 3/2015 Herbach .............. G05D 1/0011
701/23
9,944,282 B1* 4/2018 Fields ................ G06Q 30/0207
(Continued)

FOREIGN PATENT DOCUMENTS

DE 2011086210 A1 5/2013
DE 2013207369 A1 10/2014
(Continued)

OTHER PUBLICATIONS

Mar. 6, 2018 European Search Report issue on International Application No. EP17192793.

*Primary Examiner* — Babar Sarwar
(74) *Attorney, Agent, or Firm* — Clements Bernard Walker; Christopher L. Bernard

(57) ABSTRACT

A method for automated parking of a vehicle. The vehicle comprises a plurality of proximity sensors configured to detect the proximity of an object in the vicinity of the vehicle. The method comprises, in the vehicle: receiving a command to perform a parking maneuver; determining an expected parking area for the vehicle; determining a movement direction of the vehicle for reaching the expected parking area; determining a maneuver zone in the vicinity of the vehicle in the direction of the expected parking area; determining that only one object is located in the maneuver zone; determining that the object located in the maneuver zone is an authorized user of the vehicle; verifying that the authorized user moves out of the maneuver zone, thereby establishing that the maneuver zone is clear; and performing the parking maneuver.

15 Claims, 5 Drawing Sheets

(51) Int. Cl.
*B60W 50/08* (2020.01)
*G05D 1/00* (2006.01)
*G06K 9/00* (2006.01)

(52) U.S. Cl.
CPC ....... *B62D 15/0285* (2013.01); *G05D 1/0033* (2013.01); *G06K 9/00805* (2013.01)

(56) References Cited

U.S. PATENT DOCUMENTS

| | | | |
|---|---|---|---|
| 2013/0231824 A1* | 9/2013 | Wilson | G01C 21/3415 |
| | | | 701/26 |
| 2017/0021828 A1* | 1/2017 | Seo | B60W 10/10 |
| 2017/0072947 A1* | 3/2017 | Lavoie | B62D 15/0285 |
| 2017/0076603 A1* | 3/2017 | Bostick | B62D 15/0285 |
| 2017/0084179 A1* | 3/2017 | Chen | G01S 15/87 |
| 2017/0129537 A1* | 5/2017 | Kim | G05D 1/0011 |
| 2017/0358102 A1* | 12/2017 | Akiyama | G06T 7/20 |
| 2018/0029591 A1* | 2/2018 | Lavoie | G06N 7/005 |
| 2018/0136654 A1* | 5/2018 | Kentley-Klay | G05D 1/0088 |
| 2018/0194344 A1* | 7/2018 | Wang | G05D 1/0088 |
| 2018/0215382 A1* | 8/2018 | Gupta | B60R 1/00 |
| 2018/0299900 A1* | 10/2018 | Bae | G06K 9/6215 |
| 2018/0364697 A1* | 12/2018 | Elangovan | G05D 1/0016 |
| 2019/0004508 A1* | 1/2019 | Bonander | G05D 1/0016 |
| 2019/0016384 A1* | 1/2019 | Carlson | G06Q 10/00 |
| 2019/0233009 A1* | 8/2019 | Joos | G05D 1/0088 |

FOREIGN PATENT DOCUMENTS

| | | | |
|---|---|---|---|
| DE | 2015208624 A1 | 11/2016 | |
| JP | 2008174192 A | 7/2008 | |

* cited by examiner

METHOD AND SYSTEM FOR AUTOMATED PARKING OF A VEHICLE

CROSS-REFERENCE TO RELATED APPLICATION

The present patent application/patent claims the benefit of priority of co-pending European Patent Application No. 17192793.2, filed on Sep. 25, 2017, and entitled "METHOD AND SYSTEM FOR AUTOMATED PARKING OF A VEHICLE," the contents of which are incorporated in full by reference herein.

FIELD OF THE INVENTION

The present invention relates to a method and system for automatic and remotely controlled parking of a vehicle.

BACKGROUND OF THE INVENTION

Modern vehicles, and in particular cars, often come equipped with autonomous or semi-autonomous systems for performing various maneuvers of the vehicle. One such maneuver which preferably is performed automatically is a parking maneuver. The parking maneuver may be a park-out maneuver where the vehicle moves out of a parking lot or parking space, or a park-in maneuver where the vehicle moves into a parking space.

When maneuvering a vehicle with the driver on the outside, it is important to ensure that an automated system controlling the vehicle secures that the vehicle performs a parking maneuver safely.

Currently available parking systems may require that the driver uses a handheld device such as a smartphone to continuously send a "keep-alive" signal to the vehicle in order for the vehicle to perform the parking maneuver, and in some cases the parking maneuver is also preceded by pressing a button on a specific remote control. Accordingly, it is possible to be reasonably sure of that the vehicle only performs a parking maneuver as a result of an intentional action by the driver.

However, there are several potential risks associated with the described system. For example, an operator may tend to adopt the most convenient behavior when performing the parking maneuver, as when performing any task. The operator may for example send the "keep-alive" at a remote distance from the vehicle and without actually seeing the vehicle, in which case the safety of the parking maneuver is only ensured by the sensor systems of the vehicle. Even though proximity detection systems in vehicles are constantly improved, they can not be relied upon to discover all objects in the vicinity of the vehicle under all circumstances.

A further potential risk lies in the possibility that a smartphone is hacked or exposed to a man-in-the-middle attack in which case the "keep-alive" signal can be replicated without the knowledge of the operator.

Accordingly, even though presently available automated parking systems for vehicles are capable of safely performing a parking maneuver, there are still risks and there is also a reliance on the operator of the vehicle to behave in a specific manner. In view of the above, there is still a need for improved methods and systems for automated parking where the safety of the parking maneuver is further increased.

SUMMARY

In view of above-mentioned desirable properties of an automated parking system, it is an object of the present invention to provide an improved method and system for automated parking which improves the safety when performing a parking maneuver.

According to a first aspect of the invention, there is provided a method for automated parking of a vehicle, the vehicle comprising a plurality of proximity sensors configured to detect the proximity of an object in the vicinity of the vehicle. The method comprises, in the vehicle: receiving a command to perform a parking maneuver; determining an expected parking area for the vehicle; determining a movement direction of said vehicle for reaching the expected parking area; determining a maneuver zone in the vicinity of the vehicle in the direction of the expected parking area; determining that only one object is located in the maneuver zone; determining that the object located in the maneuver zone is an authorized user of the vehicle; verifying that the authorized user moves out of the maneuver zone, thereby establishing that the maneuver zone is clear; and performing the parking maneuver.

The proximity sensors of the vehicle may for example be ultrasound sensors of the same type as are commonly used as parking sensors. Such sensors are capable of detecting objects at a distance in the range of a few meters from the vehicle. The zone around the vehicle in which an object can be detected can be defined as a nearfield sensing zone of the vehicle proximity sensing system. However, it would also be possible to use other sensors such as IR- or laser-based sensing systems, alone or in combination with the aforementioned ultrasound sensors. The nearfield sensing zone may then be defined by a possible detection zone when using all of the vehicle sensor systems in combination. The proximity sensors are not only capable of determining if there is an object in the vicinity of the vehicle, they can also determine the location of such an object with sufficient accuracy for the embodiments described herein. Moreover, the proximity sensor system is preferably capable of detecting objects in a 360° area around the vehicle.

The described method for automated parking is initiated by a parking command which may be issued by a remote device located outside of the vehicle or it may be initiated by issuing a command from within the vehicle using a control panel of the vehicle or the like. The parking command may for example be issued by using an authorized key.

The expected parking area for the vehicle is the area where the vehicle is expected to end up once the parking maneuver is completed, and the maneuver zone defines the approximate area that the vehicle will have to traverse to reach the parking area from its starting position. It should be noted that the maneuver area preferably is defined with a certain safety margin such that the maneuver zone is larger than the actual area needed by the vehicle for performing the parking maneuver. A parking area is thus an area which the vehicle will move into and subsequently occupy when the parking maneuver is completed.

The authorized user may typically be the driver of the vehicle, and the authorization of the user can be performed by determining that the location of the detected object in the maneuver zone corresponds to the location of the authorized device transmitting the parking command. Such an authorized device may be a key, a key fob, a smartphone or the like which is identified and verified prior to or in connection with the initiation of the parking maneuver. The authentication of the remote device may assumed to be done using known methods of communication and verification between a vehicle and a remote key, for example using RF communication.

The present invention is based on the realization that an authorized user can aid the parking system of the vehicle in improving the safety of the parking maneuver. In particular, the authorized user acts as an additional sensor in a proximity sensor system, further ensuring that the maneuver zone is clear from obstacles. Since the operator acts as a sensor, the described sensor system can be referred to as a sensor fusion system where two sensor systems independent of each other verifies that the maneuver zone is clear. Moreover, the detection of the authorized user in the maneuver zone also acts as a test to determine that the proximity sensors function correctly. Thereby, already existing proximity sensing systems can be used in an improved automated parking system for a vehicle in a simple and cost effective manner.

According to one embodiment of the invention, the method may further comprise stopping the parking maneuver if an object enters the maneuver zone after the parking maneuver is initiated. Here it is assumed that the proximity sensing system continuously monitors the maneuver zone to determine if any object enters the maneuver zone. Thereby, the safety of the parking maneuver is ensured.

According to one embodiment of the invention the method may further comprise resuming the parking maneuver if the object having been observed to enter the maneuver zone leaves the maneuver zone. Thereby, it is not required to restart the entire parking sequence if an object passes through the maneuver zone. Instead, the vehicle stops and waits for the object to pass through and out of the maneuver zone.

According to one embodiment of the invention, the method may further comprise verifying that the authorized user leaves the maneuver zone in a direction towards the expected parking area. Thereby, it can be determined that the path towards the expected parking area is clear. For a park-in maneuver, the expected parking area may be a parking space identified by the parking system, and for a park-out maneuver the expected parking area may be defined by selecting the desired travel direction for the vehicle, e.g. right, left or straight ahead out of a parking space.

According to one embodiment of the invention, the method may further comprise verifying that the authorized user is monitoring the parking maneuver. In order to ensure that the parking maneuver is performed safely by the vehicle, the authorized user can be required to verify that the user is "in-the-loop", meaning that the authorized user in some way actively monitors the parking maneuver. This can for example be achieved by requiring that the authorized user is constantly moving a finger over a smartphone screen, for example between two fixed positions, thereby upholding a "keep alive" signal to verify that the driver is in-the-loop. The smartphone is in contact with the parking control system of the vehicle which thereby can verify that the authorized user is monitoring the parking maneuver.

According to one embodiment of the invention, the method may further comprise stopping the parking maneuver if the authorized user is not monitoring the parking maneuver.

According to one embodiment of the invention, determining that the object located in the maneuver zone is an authorized user of the vehicle may comprise determining that an authorized key is located in the maneuver zone. The authorized key is identified and verified prior to the parking sequence begins. This may be done using known methods of communication and verification between a vehicle and a remote key, for example using RF communication. Moreover, the authorized key may be a key fob, a smartphone or any other electronic device capable of and suitable for communicating with the vehicle.

According to one embodiment of the invention, the method may further comprise tracking the location of an object in the maneuver zone. By tracking the location of the authorized user, it can be verified that the maneuver zone has been cleared by the authorized user and not by any other moving object which may enter the maneuver zone.

According to one embodiment of the invention, the method may further comprise, after verifying that the authorized user moves out of the maneuver zone, verifying that the authorized user is located in a direction towards the intended parking area. The authorized user can thus be assumed to be located outside of the maneuver zone while still being within the nearfield sensing zone. Thereby, the proximity sensing system can track the movement and determine the location of the authorized user. The location of the authorized user may then act as guidance for the vehicle when maneuvering towards the parking area. It may also be required that the authorized user moves towards the parking area for the vehicle to perform the parking maneuver. The proximity sensing system may also be configured to verify that the authorized user leaves the maneuver zone in a direction approximately towards the parking area.

According to a second aspect of the invention, there is provided a system for automated parking of a vehicle, the system comprising: a plurality of proximity sensors arranged in the vehicle and configured to detect the presence of an object in the vicinity of the vehicle; and a parking control unit. The parking control unit is configured to: receive a command to perform a parking maneuver; determine an expected parking area for the vehicle; determine a movement direction of said vehicle for reaching the expected parking area; determine a maneuver zone in the vicinity of the vehicle in the direction of the expected parking area; determine that only one object is located in the maneuver zone; determine that the object located in the maneuver zone is an authorized user of the vehicle; verify that the authorized user moves out of the maneuver zone, thereby establishing that the maneuver zone is clear; and control the vehicle to perform the parking maneuver.

According to one embodiment of the invention, the system may further comprise a remote device configured to transmit a parking command to the vehicle. The remote device may for example be a key, a key fob or a smartphone configured to communicate with the vehicle. A smartphone may advantageously comprise a user interface dedicated to initiating and/or controlling the parking maneuver.

According to one embodiment of the invention the proximity sensors may be ultrasound sensors. An ultrasound-based proximity sensing system is used as a parking sensor in a vehicle, to alert the driver of objects close to the vehicle. Such a proximity sensing system may also be configured such that the location of an object in a nearfield sensing zone of the vehicle can be tracked. Accordingly, the described proximity sensing system can to a large extent be formed using sensors and components already existing in the vehicle.

Additional effects and features of the second aspect of the invention are largely analogous to those described above in connection with the first aspect of the invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the system and method according to the present invention are mainly described with reference to a method and system where the authorized user is a person which is also the driver of the vehicle. However, it is equally possible that the authorized user is a robot or another automated feature which acts to guide the vehicle during the parking maneuver.

Figure 1:
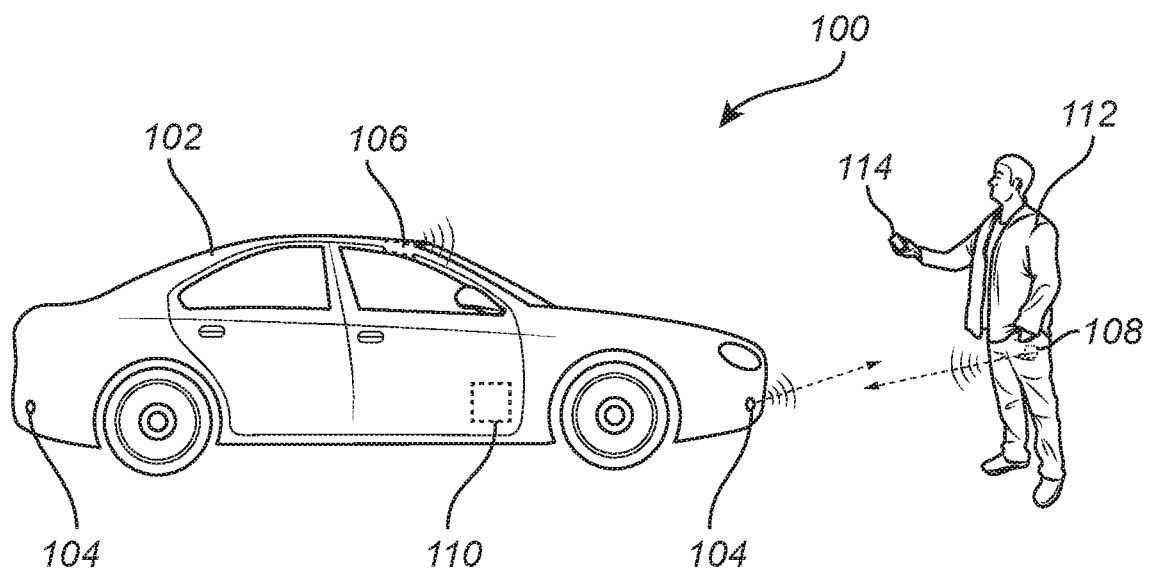
FIG. 1 schematically illustrates an automated parking system according to an embodiment of the invention.

FIG. 1 schematically illustrates an automated parking system 100 in a vehicle 102 according to an embodiment of the invention. The system 100 comprises a plurality of proximity sensors 104 arranged in the vehicle 102. The proximity sensors 104 are configured to detect the proximity of an object in the vicinity of the vehicle 102. The proximity sensors 104 may for example be ultrasound transducers capable of transmitting and receiving ultrasound signals, where the system is configured to detect and track the location of an object being within the range of the proximity sensors 104. In particular, the proximity sensors 104 are capable of accurately determining the location of an object if at least two different proximity sensors 104 can transmit a signal towards and receive a corresponding reflected signal from the object. Such a sensor configuration can for example be achieved by arranging one proximity sensor 104 in each corner of the vehicle, where the coverage of the sensor in the ground plane is 270°. It is of course also possible to achieve the same effect using a larger number of proximity sensors 104 arranged in the vehicle.

The system 100 further comprises a radio transceiver 106, such as a Bluetooth device and/or an RF transceiver, arranged in the vehicle 102 and configured to communicate with an authorization key 108 located outside of the vehicle 102, and the vehicle also comprises a parking control unit 110. Authorization of a key 108 may thereby be performed using e.g. RF communication based on known methods, where a broadcast from the vehicle 102 can be used to discover the key 108.

The parking control unit 110 of the vehicle 102 is configured to control the vehicle 102, the proximity sensors 104 and the communication between the vehicle 102 and the user device 108 in order to perform the steps of the method for automated parking described in the following.

The parking control unit 110 may include a microprocessor, microcontroller, programmable digital signal processor or another programmable device. The control unit 110 may also, or instead, include an application specific integrated circuit, a programmable gate array or programmable array logic, a programmable logic device, or a digital signal processor. The functionality of the control unit 110 may also be provided by several different physical units. Where the control unit 110 includes a programmable device such as the microprocessor, microcontroller or programmable digital signal processor mentioned above, the processor may further include computer executable code that controls operation of the programmable device. Moreover, the parking control unit 110 may be a general purpose control unit of the vehicle 102, or it may be a dedicated control unit 110 specifically configured to control the automated parking system 100.

It should also be noted that a parking maneuver according to various embodiments of the invention typically is initiated by a driver of the vehicle 102. The driver may for example issue a parking command using an interface in the vehicle 102, using a smartphone 112 or the like, or by pressing a dedicated button on a key or key fob 108. Thereby, the parking maneuver can be initiated both from within the vehicle 102 as well as from outside of the vehicle 102. Moreover, it is typically required that the vehicle 102 has recognized the presence of an authorized key 108, or received authorization in any other way, before any commands are accepted by the vehicle 102.

Figure 2:
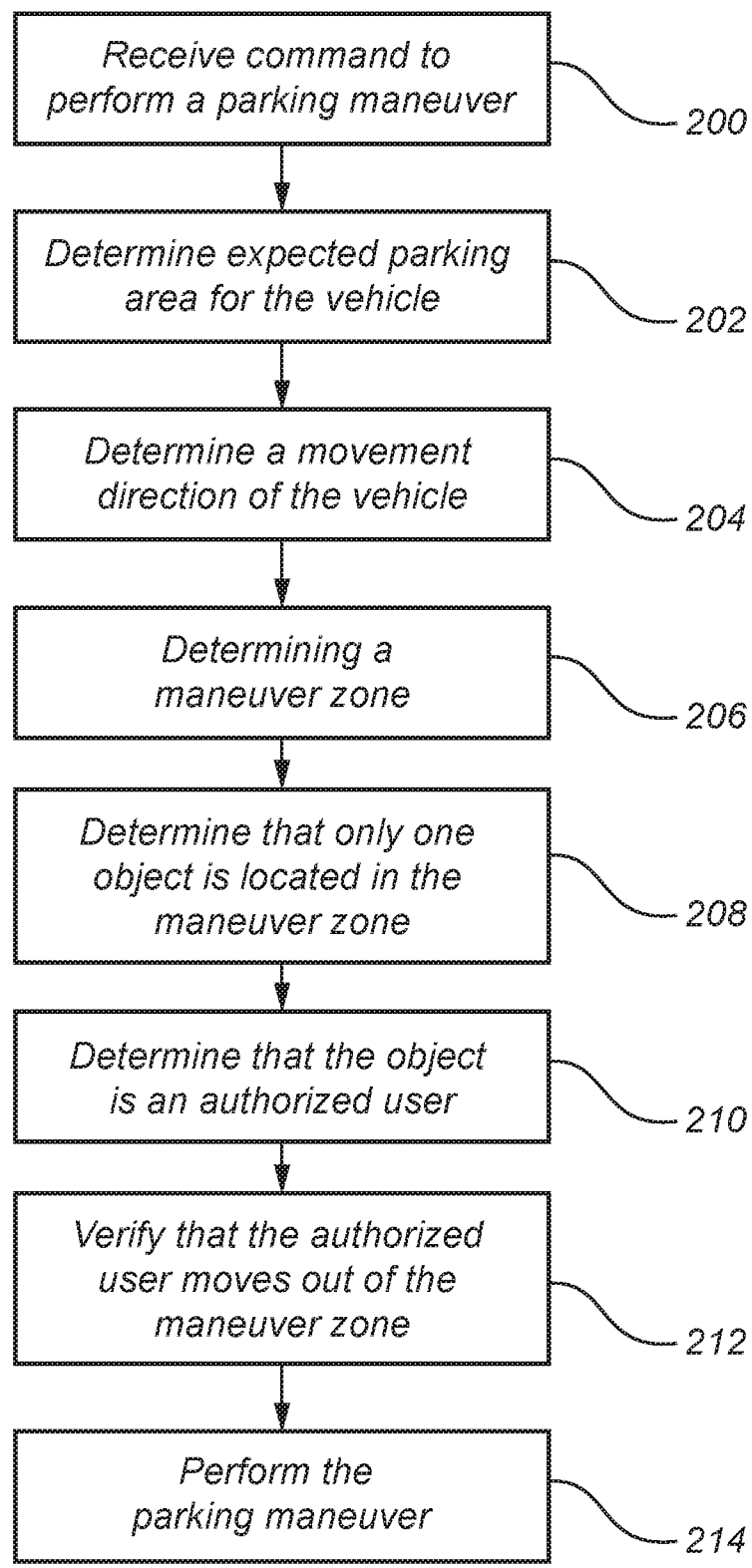
FIG. 2 is a flow chart outlining the general steps of a method according to an embodiment of the invention.

FIG. 2 is a flow chart illustrating the general steps of a method according to an embodiment of the invention. The method outlined by the flow chart of FIG. 2 will be discussed with further reference to FIGS. 3A-F schematically illustrating a vehicle 102 performing a park-out maneuver according to an embodiment of the invention. It should however be noted that the described invention equally well is applicable when performing a park-in maneuver.

Figure 3A:
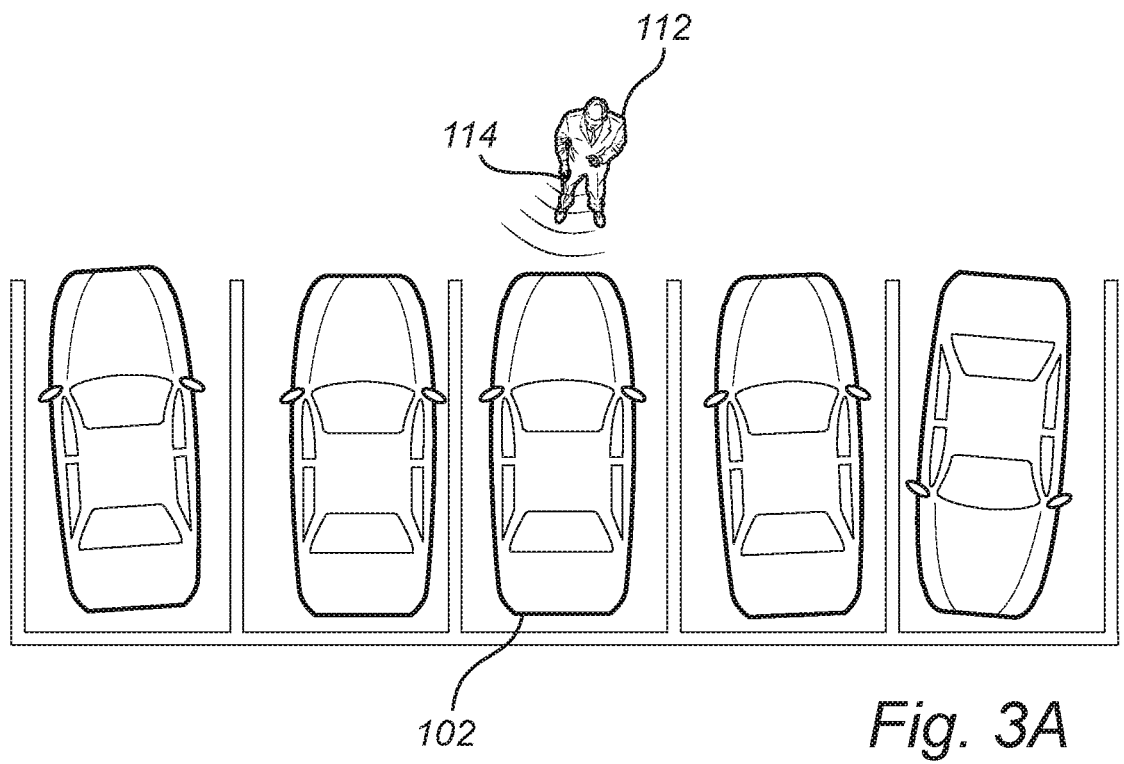
FIGS. 3A-F schematically illustrate steps of a method according to an embodiment of the invention.

In a first step, illustrated in FIG. 3A, the vehicle receives 200 a command to perform a parking maneuver. The command can be received from a user operated device such as a smartphone 114 via a Bluetooth of WiFi connection.

Figure 3B:
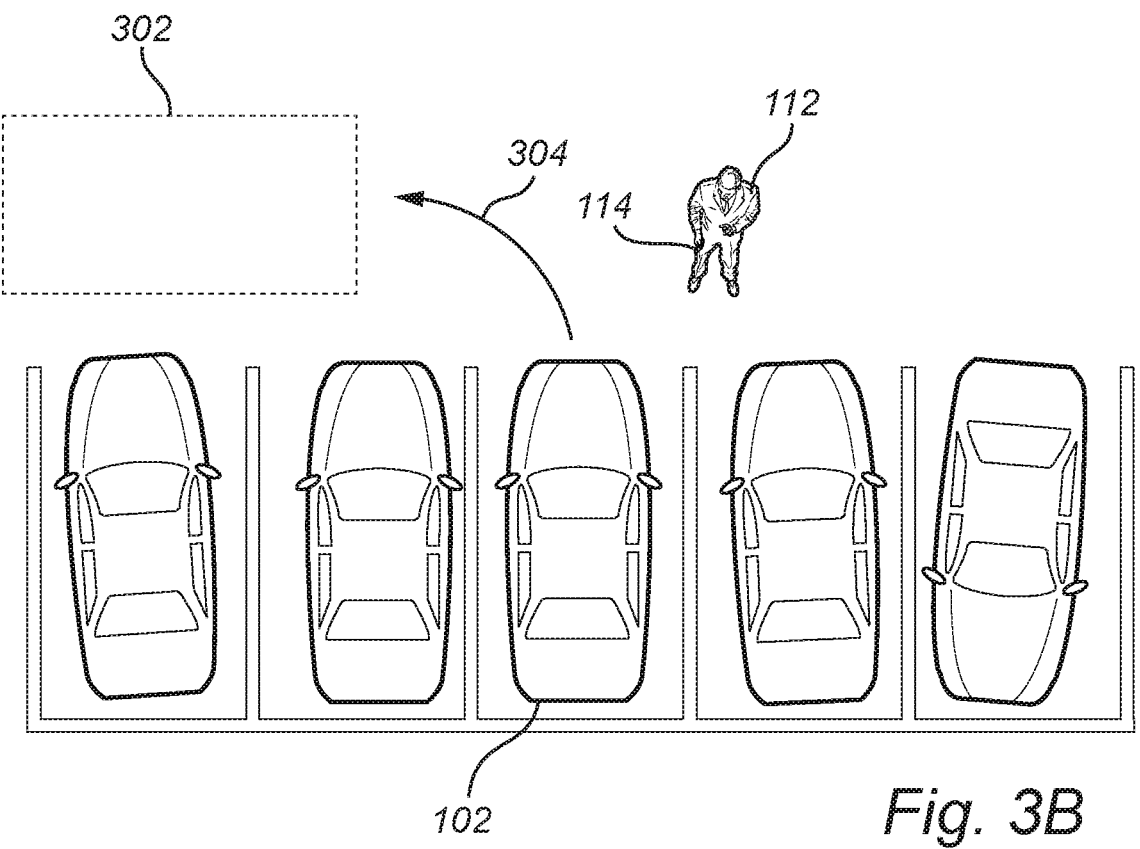

Next, an expected parking area 302 for the vehicle 102 is determined 202 as illustrated in FIG. 3B. The expected parking area 302 is the area where the vehicle 102 is controlled to stop after the parking maneuver is completed. In FIG. 3B, the expected parking are 104 is an area outside of the parking pocket where the driver can conveniently enter the vehicle 102. The parking area 302 may for example be selected by the driver by using an interface on the smartphone 114 to select a precise parking location for the vehicle 114. In one embodiment, a set of possible parking locations is determined by the vehicle 102 and presented to the driver for selection. The parking area may also be defined by issuing a simplified command such as "left", "right", or "straight ahead" to the vehicle in which case the vehicle determines the precise final parking location according to the received command.

Once a parking area 302 is determined, a movement direction 304 of the vehicle 102 for reaching the expected parking area 302 is also determined as illustrated in FIG. 3B.

Figure 3C:
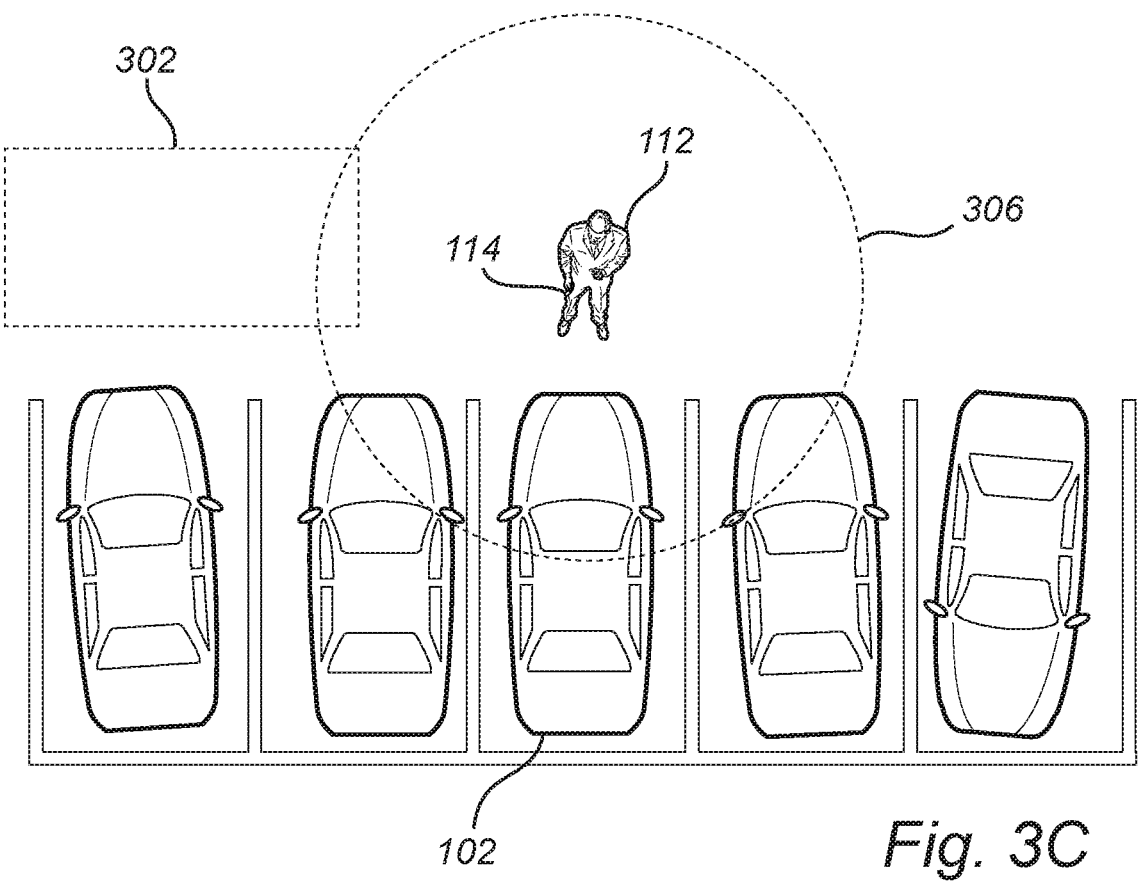

Next, a maneuver zone 306 is determined 206 in the vicinity of the vehicle 102 in the direction of the expected parking area 302, between the vehicle 102 and the parking area 302, illustrated in FIG. 3C. The maneuver zone 306 is defined by the area in which the vehicle 102 is expected to travel during the parking maneuver, with a certain safety margin. The maneuver zone 306 may for example be defined to approximately correspond to a typical envelope in a manual parking maneuver.

In the next step, it is determined 208 that only one object is located in the maneuver zone 302. It is further determined 210 that the object located in the maneuver zone 302 is an authorized user 102 of the vehicle 102. Determining that the object located in the maneuver zone 302 is an authorized user 102 includes determining that an authorized key 108 is located in the maneuver zone 306. The key 108 can be assumed to have been authorized earlier, for example in connection with issuing of the parking command. The location of the authorized key 108 may be determined for example using an RF communication channel previously established between the key 108 and the vehicle 102 in combination with the proximity sensing system of the vehicle 102. The determined location of the authorized key 108 is then matched with the maneuver zone 306 to verify that the key 108 is within the maneuver zone 306. However, since the maneuver zone 304 typically has a certain extension, it is not required that the location of the key 108 is precisely determined. It is sufficient that it can be verified that the key 108 is within the correct area.

Figure 3D:
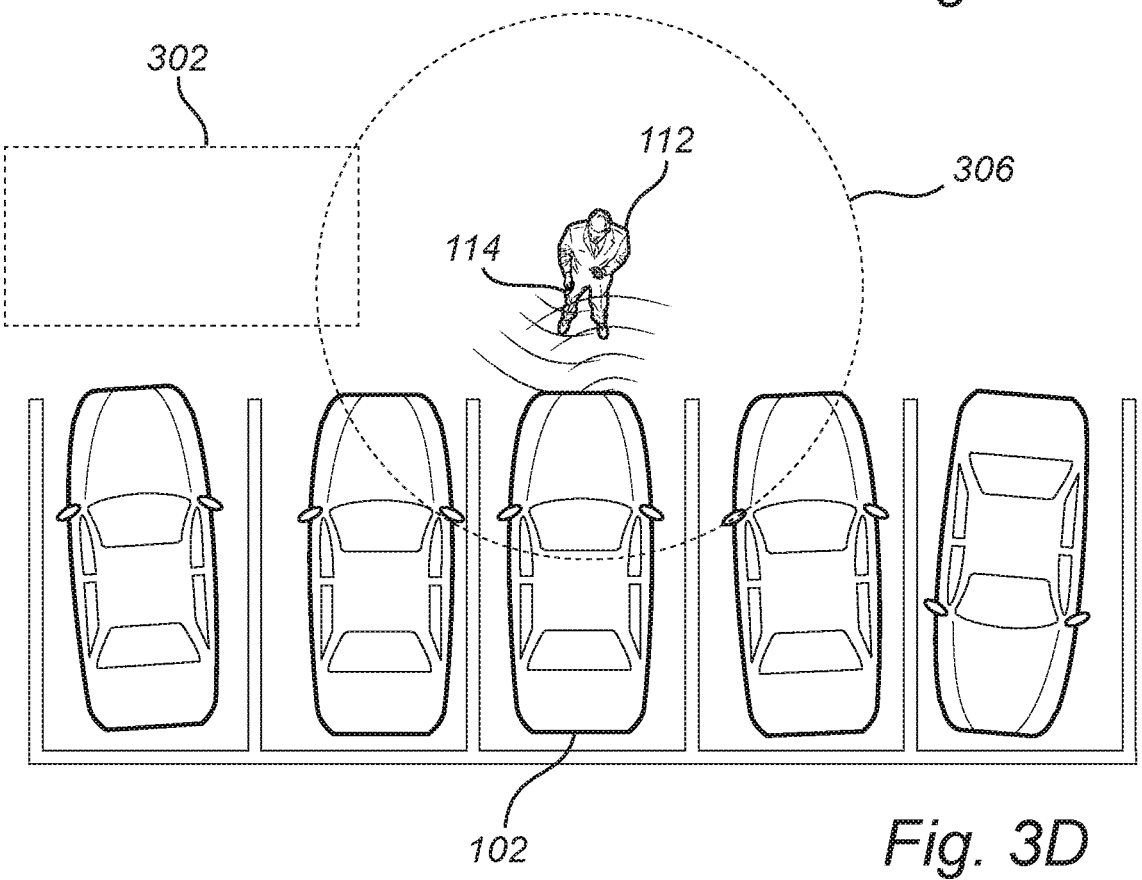

The next steps, comprising determining 208 that only one object is located in the maneuver zone 306 and determining 210 that the object located in the maneuver zone 306 is an authorized user 112 of the vehicle 102 can be performed using the proximity sensing system possibly in combination with a communication channel established between the vehicle 102 and a key 108. If the proximity sensing system detects only one object in the maneuver zone 306, and if the location of the key 108 can be determined to be within the maneuver zone 306, the detected object can be defined as an authorized user 112 as illustrated by FIG. 3D. If a position determination system is available where a more accurate determination of the location of the key 108 is possible, verifying the authorized user 112 may comprise determining that the location of the key 108 is the same as the location of the only detected object in the maneuver zone 306.

Figure 3E:
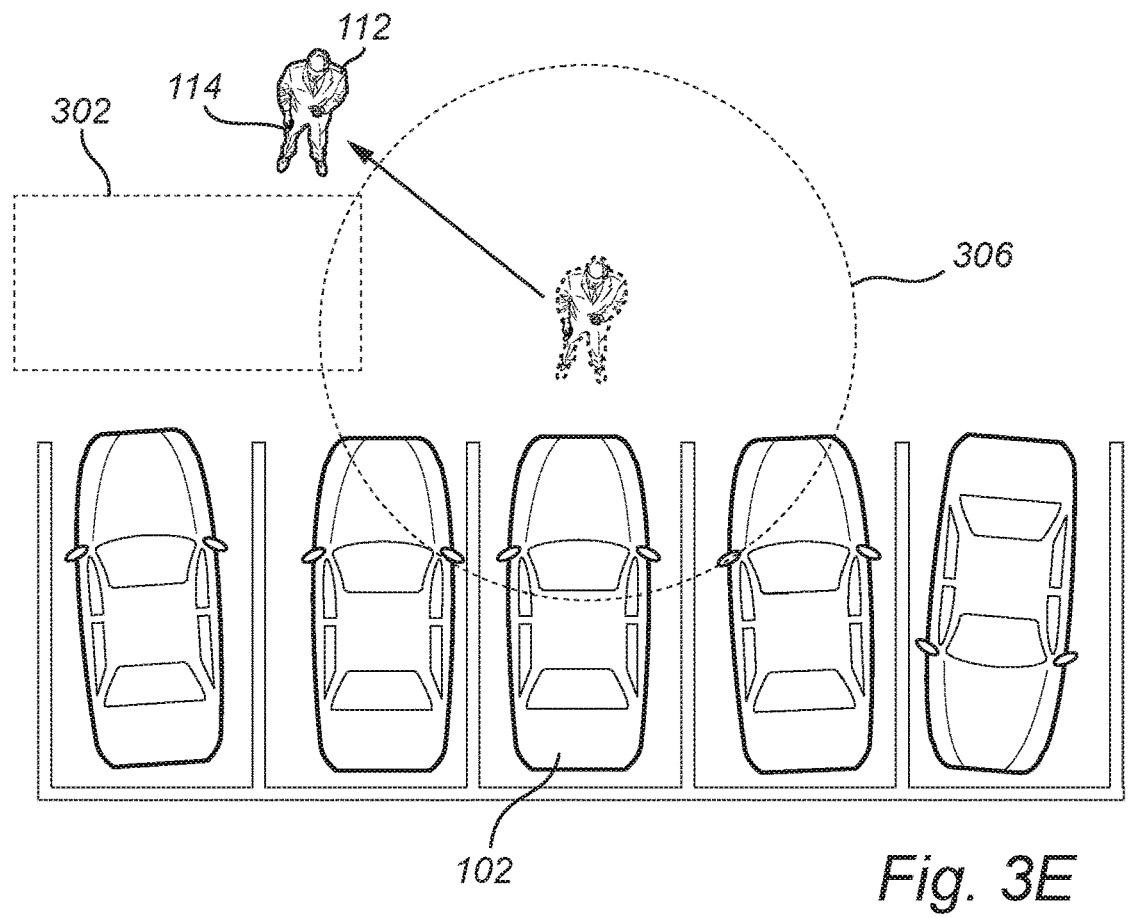

Once it is determined that the authorized user 112 is the only object located in the maneuver zone 306, the next step comprises verifying 212 that the authorized user 112 moves out of the maneuver zone 306 as illustrated in FIG. 3E. Thereby, it can be established that the maneuver zone 306 is clear; and that the parking maneuver can start. The authorized user 112 is thereby treated as an additional sensor of the automated parking system where the authorized user 112 "clears" the maneuver zone 306. It can also be assumed that if the authorized user 112 observes an object in the maneuver zone 306 which is not detected by the proximity sensing system, the authorized user 112 does not initiate a parking maneuver at all.

Figure 3F:
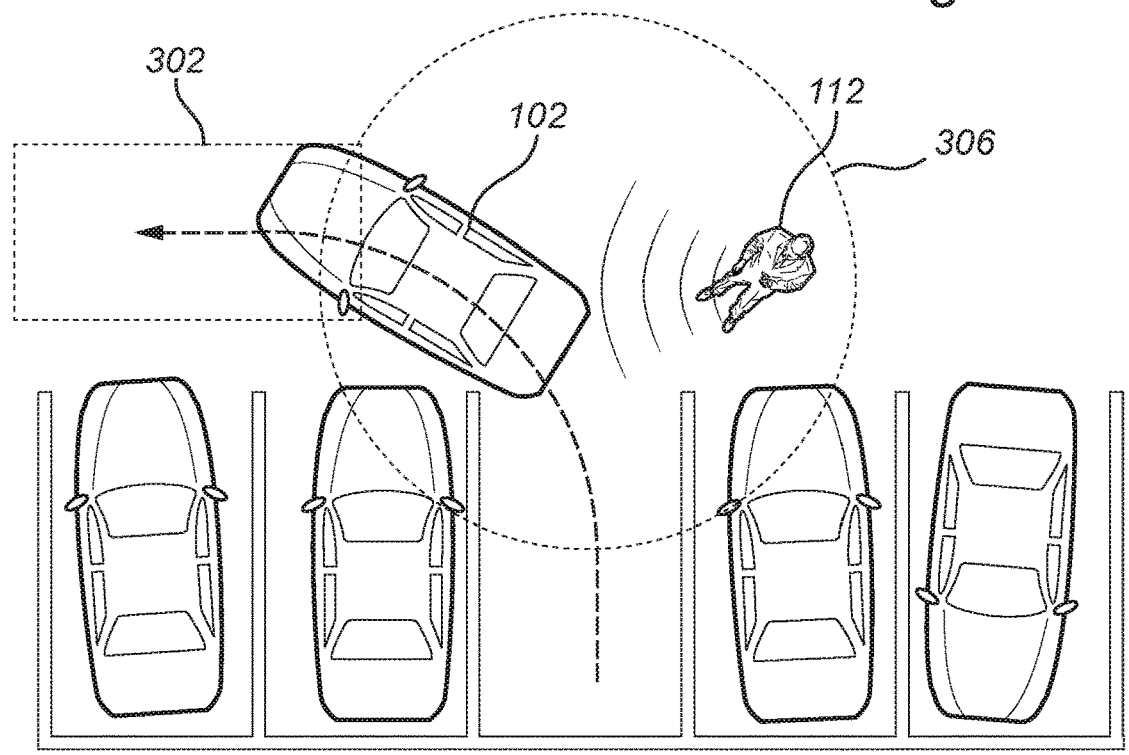

Finally, the vehicle 102 performs 214 the parking maneuver as illustrated in FIG. 3F. During the parking maneuver, it is to be understood that the proximity sensing system continuously monitors the maneuver zone 306 to detect any object entering the drivable area. In order for the brake system to be able to stop the vehicle in time, the speed and acceleration of the vehicle, as well as the distance to objects in the nearfield sensing zone, is kept within predetermined boundaries.

If any object enters the maneuver zone 306 during the parking maneuver, the parking maneuver is stopped, or paused. The parking maneuver may resume it can be determined that the object having been observed to enter the maneuver zone leaves the maneuver zone such that the maneuver zone is once again clear. The maneuver zone 306 may also be redefined and moved during the parking maneuver, for example when the parking maneuver requires that the vehicle 102 moves in a path which is not fully visible by the vehicle 102 from its starting position. Accordingly, the initially determined maneuver zone 306 is here limited by the field of view of the proximity sensing system.

Even though the invention has been described with reference to specific exemplifying embodiments thereof, many different alterations, modifications and the like will become apparent for those skilled in the art. Also, it should be noted that parts of the method and system may be omitted, interchanged or arranged in various ways, the method and system yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. Method for automated parking of a vehicle, the vehicle comprising a plurality of proximity sensors configured to detect the proximity of an object in the vicinity of the vehicle, the method comprising, in the vehicle:
   receiving a command to perform an automated parking maneuver;
   determining an expected parking area for the vehicle;
   determining a movement direction of the vehicle for reaching the expected parking area;
   determining a maneuver zone in the vicinity of the vehicle in the direction of the expected parking area;
   determining that only one object is located in the maneuver zone;
   determining that the object located in the maneuver zone is an authorized user of the vehicle;
   verifying that the authorized user moves out of the maneuver zone, thereby establishing that the maneuver zone is clear; and
   performing the automated parking maneuver along a path through the maneuver zone determined by the vehicle and independent of movement of the authorized user outside of the maneuver zone.

2. The method according to claim 1, further comprising stopping the parking maneuver if an object enters the maneuver zone after the parking maneuver is initiated.

3. The method according to claim 2, further comprising resuming the parking maneuver if the object having been observed to enter the maneuver zone leaves the maneuver zone.

4. The method according to claim 1, further comprising verifying that the authorized user leaves the maneuver zone in a direction towards the expected parking area.

5. The method according to claim 1, further comprising verifying that the authorized user is monitoring the parking maneuver.

6. The method according to claim 5, further comprising stopping the parking maneuver if the authorized user is not monitoring the parking maneuver.

7. The method according to claim 1, wherein determining that the object located in the maneuver zone is an authorized user of the vehicle comprises determining that an authorized key is located in the maneuver zone.

8. The method according to claim 1, further comprising tracking the location of an object in the maneuver zone.

9. The method according to claim 1, further comprising, after verifying that the authorized user moves out of the maneuver zone, verifying that the authorized user is located in a direction towards the intended parking area.

10. System for automated parking of a vehicle, the system comprising:

a plurality of proximity sensors arranged in the vehicle and configured to detect the presence of an object in the vicinity of the vehicle; and a parking control unit configured to:

receive a command to perform an automated parking maneuver;

determine an expected parking area for the vehicle;

determine a movement direction of said vehicle for reaching the expected parking area;

determine a maneuver zone in the vicinity of the vehicle in the direction of the expected parking area;

determine that only one object is located in the maneuver zone;

determine that the object located in the maneuver zone is an authorized user of the vehicle;

verify that the authorized user moves out of the maneuver zone, thereby establishing that the maneuver zone is clear; and control the vehicle to perform the automated parking maneuver along a path through the maneuver zone determined by the vehicle and independent of movement of the authorized user outside of the maneuver zone.

11. The system according to claim 10, further comprising a remote device configured to transmit a parking command to the vehicle.

12. The system according to claim 11, wherein the remote device is a key, key fob or smartphone configured to communicate with the vehicle.

13. The system according to claim 10, wherein the proximity sensors are ultrasound sensors.

14. The system according to claim 10, wherein the parking control unit is further configured to stop the parking maneuver if an object enters the maneuver zone after the parking maneuver is initiated.

15. The system according to claim 10, wherein the parking control unit is further configured to resume the parking maneuver if the object having been observed to enter the maneuver zone leaves the maneuver zone.

* * * * *